No. 719,964. PATENTED FEB. 3, 1903.
W. F. WHEELER.
ARTIFICIAL TOOTH.
APPLICATION FILED MAR. 4, 1902.
NO MODEL.
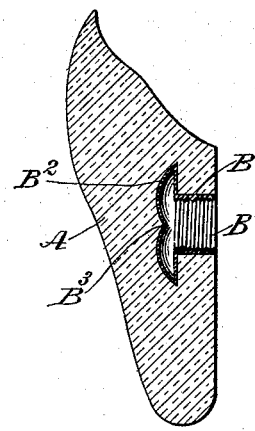
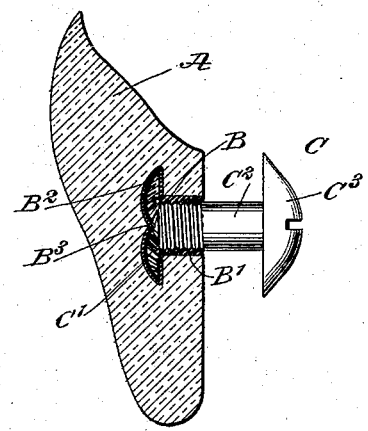
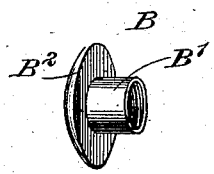
WITNESSES:
INVENTOR
Walter F. Wheeler
BY
ATTORNEYS

UNITED STATES PATENT OFFICE.

WALTER F. WHEELER, OF SPENCER, MASSACHUSETTS.

ARTIFICIAL TOOTH.

SPECIFICATION forming part of Letters Patent No. 719,964, dated February 3, 1903.

Application filed March 4, 1902. Serial No. 96,595. (No model.)

*To all whom it may concern:*

Be it known that I, WALTER F. WHEELER, a citizen of the United States, and a resident of Spencer, in the county of Worcester and State of Massachusetts, have invented new and useful Improvements in Artificial Teeth, of which the following is a full, clear, and exact description.

The object of the invention is to provide certain new and useful improvements in artificial teeth whereby the cost thereof is greatly lessened and at the same time a very strong and durable attaching-stud is provided.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is an enlarged sectional side elevation of the tooth-body and socket. Fig. 2 is an enlarged side elevation of the stud or pin for insertion in the socket. Fig. 3 is an enlarged sectional side elevation of the complete tooth, and Fig. 4 is a perspective view of the socket.

The artificial tooth shown in Fig. 3 consists, essentially, of a tooth-body A, a socket B, immovably held in the tooth-body A, and a retaining stud or pin C. The tooth-body A is made of porcelain or other suitable material, and the socket B is placed into the plastic mass of the body previous to baking the same, and the said socket is made of platinum or other metal which is less fusible than the tooth-body, so that when the latter is baked in the usual manner the socket is firmly embedded in the body. The socket B is formed with a hollow internally-threaded shank B', flush at the outer end with the rear face of the tooth-body A, and on the inner end of the said shank B' is secured or formed a hollow head $B^2$, which holds the socket against removal from the body A. The head $B^2$ is formed at its middle with an outwardly-extending cone $B^3$, adapted to be engaged by prongs C', formed on the end of the threaded shank $C^2$ of the stud or pin C at the time the latter is screwed into the hollow shank B', the said prongs C' spreading outwardly into the outer ends of the head $B^2$, so that the stud or pin is held locked in position in the socket.

The stud C is provided with a suitable head $C^3$, and the said shank $C^2$ of the stud fits snugly on the hollow shank B', it being, however, expressly understood that I do not limit myself to any particular form of the shank $C^2$ in cross-section, nor that of the hollow shank B'—that is, the screw-threads on both shank and socket may be omitted, if desired.

By the arrangement described the head $B^2$ of the socket B forms a retaining means for holding the socket in position on the tooth-body, and at the same time the said head forms a retaining means for the prongs C' of the shank $C^2$ to securely hold the stud in position on the socket.

The pin or stud C can be made of any desired metal, preferably, however, one that is considerably less expensive than the one required for the socket B, and as the latter and the stud do not require to be made of the same expensive metal it is evident that the tooth can be very cheaply manufactured.

When forcibly unscrewing the stud C, the prongs C' readily compress to their original position to pass the bore of the socket. The stud C is only removed in case repairs have to be made. The prongs on the stud and the cone on the socket may be omitted, if desired.

Having thus described my invention, I claim as new and desire to secure by Letters Patent—

1. An artificial tooth having an internally-threaded socket baked in the tooth-body, and a threaded stud screwing in the said socket, the stud having prongs spreading in the socket, to lock the stud against unscrewing, as set forth.

2. An artificial tooth having an internally-threaded socket in the tooth-body, and a stud screwing into the socket and having an interlocking engagement at its inner end with the inner end of the said socket, as set forth.

3. An artificial tooth having a socket baked in the tooth-body, the said socket being of a less fusible material than that of the tooth-body, the said socket having a head at its inner end for holding the socket against removal from the body, and a stud entering the socket and having an interlocking engagement with the head of the socket to hold the stud against removal from the socket, as set forth.

4. An artificial tooth having a socket embedded in the tooth-body, the socket being provided with a projection at its inner end, and a stud having non-resilient members capable of spreading when the stud is passed into the socket into engagement with the projection thereof, as set forth.

5. An artificial tooth having a socket embedded in the tooth-body, the said socket being provided with a head having a central conical projection, and a stud having members capable of spreading when the stud is passed into the socket into engagement with the projection of the head, as set forth.

6. An artificial tooth comprising a tooth-body, a socket embedded therein and having a hollow internally-threaded shank and a hollow head at the inner end of the shank, the said head being formed with a spreading cone, and a screw-threaded stud having a shank formed with prongs, adapted to engage the said spreading cone to spread the prongs inside of the head, as set forth.

In testimony whereof I have signed my name to this specification in the presence of two subscribing witnesses.

WALTER F. WHEELER.

Witnesses:
E. R. WHEELER,
HENRY H. WHEELER.